United States Patent
Potukuchi et al.

(10) Patent No.: US 12,204,615 B2
(45) Date of Patent: Jan. 21, 2025

(54) IDENTIFICATION OF MISMATCH GEODATA BASED ON AN ENSEMBLE OF WEAK SUPERVISION-BASED MATCH LABELS AND GEO SIMILARITY MODELS

(71) Applicant: MASTERCARD INTERNATIONAL INCORPORATED, Purchase, NY (US)

(72) Inventors: Srikanth Potukuchi, Hamilton (CA); Ravi Santosh Arvapally, Telangana (IN); Michael Armanious, Woodbridge (CA); Ahmed Menshawy, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/319,054

(22) Filed: May 17, 2023

(65) Prior Publication Data
US 2024/0394339 A1   Nov. 28, 2024

(51) Int. Cl.
*G06F 16/28*   (2019.01)
*G06F 18/2413*   (2023.01)

(52) U.S. Cl.
CPC .............. *G06F 18/24147* (2023.01)

(58) Field of Classification Search
CPC ...... G06F 40/295; G06F 16/906; G06F 16/29; G06F 16/35; G06F 16/55; G06F 16/285; G06F 16/587; G06F 18/24147
See application file for complete search history.

(56) References Cited

U.S. PATENT DOCUMENTS

| | | | |
|---|---|---|---|
| 9,495,614 B1* | 11/2016 | Boman | G06F 16/29 |
| 2015/0012501 A1* | 1/2015 | Xing | G06F 16/215 |
| | | | 707/690 |

OTHER PUBLICATIONS

"Learning Geolocations for Cold-start and Hard-to-Resolve Addresses via Deep Metric Learning", Govind et al., Proceedings of EMNLP 2022 Industry Track pp. 332-341, Dec. 9-11, 2020.*

* cited by examiner

*Primary Examiner* — Apu M Mofiz
*Assistant Examiner* — Cindy Nguyen
(74) *Attorney, Agent, or Firm* — pillsbury winthrop shaw pittman llp

(57) ABSTRACT

The disclosure relates to methods and systems of generating geodata match classifications based on an ensemble of weak supervision-based match labels and geo-similarity models. The system may generate at least two match classifiers that are ensembled together. The match classifiers may include a location name classifier and a geo-similarity classifier. The location name classifier may generate a match classification that is based on a similarity of characters of the location names. The geo-similarity classifier may generate a match classification that is based on a proximity of the geolocations defined by the location names. The match classifications may be aggregated together to generate a geodata match classification.

20 Claims, 6 Drawing Sheets

IDENTIFICATION OF MISMATCH GEODATA BASED ON AN ENSEMBLE OF WEAK SUPERVISION-BASED MATCH LABELS AND GEO SIMILARITY MODELS

BACKGROUND

Machine learning models such as classifiers trained on a corpus of training data can be powerful at making predictions using input data. However, classifiers that are trained using various machine learning techniques may be prone to training and execution errors due to data variability in the training data or input data. This data variability can be caused by errors in the data, unstructured content in the data, and/or other reasons. Data variability may result in inaccurate results particularly for geodata in which location names are defined by strings that can be prone to errors and/or variations in which humans provide names for locations. For example, it may be difficult for a computer to determine whether a first location name and a second location name refer to the same geolocation. Thus, a model that is trained to predict whether the first location name and the second location name refer the same geolocation may be sensitive to high variance, low accuracy, and feature noise and bias. These and other issues may exist with matching geodata.

BRIEF DESCRIPTION OF THE DRAWINGS

Features of the present disclosure may be illustrated by way of example and not limited in the following figure(s), in which like numerals indicate like elements, in which.

DETAILED DESCRIPTION

Figure 1:
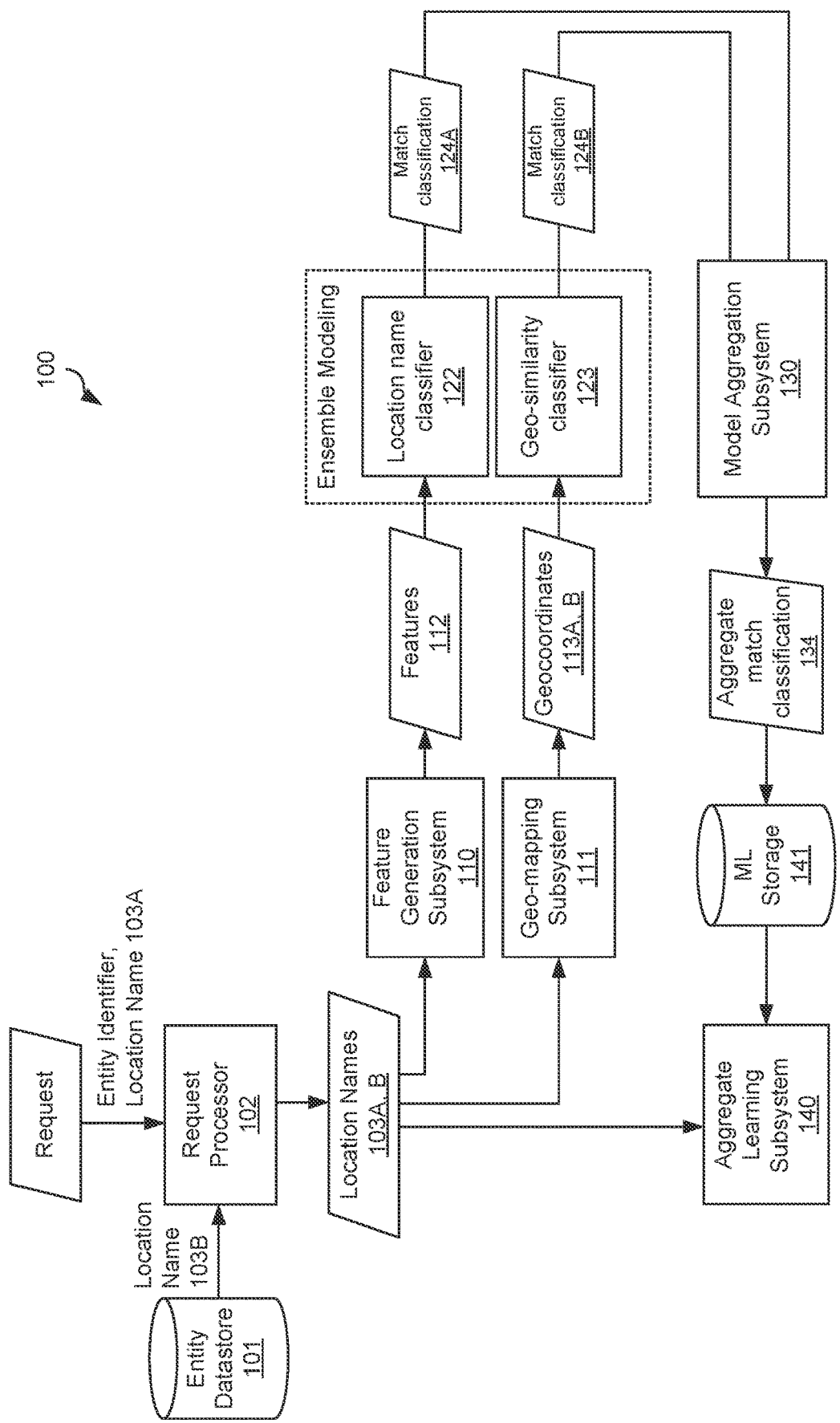
FIG. 1 illustrates an example of a system environment for identifying mismatched geodata based on an ensemble of weak supervision-based location name match classification and a geo similarity classification.

The disclosure relates to methods and systems of generating geodata match classifications based on an ensemble of weak supervision-based match labels and geo-similarity models. Geodata match classification is a computational prediction that two or more location names identify the same geolocation or similar geolocation within a threshold geo-similarity. Thus, location names that match one another are predicted to identify the same or similar geolocation. A geolocation is a geographically definable location, which may be defined by one or more geocoordinates. In some instances, two or more location names may relate to the same geolocation but may be named differently, have errors, or otherwise may vary with respect to one another. This may result in a false negative match. In other instances, two or more location names may relate to different geolocations but may have characters that are similar to one another, resulting in a false positive match.

To mitigate against these and other issues with geodata match classification, a system may generate at least two match classifiers that are ensembled together. The match classifiers may include a location name classifier, a geo-similarity classifier, and/or other types of classifiers. The location name classifier may generate a match classification based on a similarity of characters of the location names. The geo-similarity classifier may generate a match classification based on a proximity of the geolocations defined by the location names. The match classifications may be aggregated together to generate a geodata match classification.

The location name classifier may use one or more weak supervision-based labeling functions. The labeling functions may automatically label two strings as a match. The location name classifier may tolerate typographical errors, translocation of terms (such as "New York City" and "City of New York"), and/or other variations that may occur between characters in the location names. The location name classifier may use one or more similarity metrics that are derived from the location names. For example, the system may generate one or more features for the location name classifier. The features may be derived from similarity metrics between the location names.

The geo-similarity classifier may determine a proximity between geolocations defined by the location names. To determine the proximity between location names, the system may transform the location names into respective geocoordinates for geo-similarity classification. A geocoordinate is positional data that indicates a location on Earth other than a location name. A geocoordinate may include a geocoordinate point such as a latitude and longitude point, geodetic coordinates that define a position on Earth, and/or other value that can be used to locate a point on Earth. A location name is transformable to a geocoordinate when the location name may be used to directly or indirectly obtain a corresponding geocoordinate. If available, the geocoordinates may be provided to the geo-similarity classifier, which generates a match classification based on a proximity between the geocoordinates transformed from the location names. The match classification generated by the geo-similarity classifier is a prediction that the location names match based on the proximity.

The location name classifier and the geo-similarity classifier may be ensembled together to generate the geodata match classification. In particular, geodata match classification may be an aggregate of the match classifications from the location name classifier, the geo-similarity classifier, and/or other classifiers. The system may aggregate the match classifications in various ways. In one example, the system may rank the location name classifier and geo-similarity classifier with respect to one another and select a match classification based on the ranking when they disagree. For example, if the location name classifier generates a match classification indicating a match but the geo-similarity classifier generates a match classification indicating a mismatch, then the geodata match classification will indicate a mismatch. The ranking may be applied for other numbers of classifiers (>2) that may be used. In some examples, the system may aggregate the match classification in other ways such as majority vote, averaging if match classifications are output as probabilistic values, and/or other aggregation techniques.

Each of the match classifications may be monitored to determine whether the prediction was correct. For example, a subject matter expert may determine that a pair of location names was correctly predicted as a match, which may be fed back to retrain one or more of the classifiers to improve their performance and/or to train another classifier to make aggregate geolocation match classifications.

Having described a high-level overview of system operations and example use of the system, attention will now turn to an example of a system environment for match classification. For example, FIG. 1 illustrates an example of a system environment 100 for identifying mismatched geo-data based on an ensemble of weak supervision-based location name match classification (such as match classification 124A) and a geo similarity classification (such as match classification 124B).

The system environment 100 may include an entity datastore 101, a request processor 102, a feature generation subsystem 110, a geo-mapping subsystem 111, an ensemble of models comprising a location name classifier 122, a geo-similarity classifier 123, and/or other models (not illustrated), a model aggregation subsystem 130, an aggregate learning subsystem 140, and/or other features. Each of the components 102, 110, 111, 122, 123, 130, and 140 may be implemented in hardware and/or software. For example, each of the components 102, 110, 111, 122, 123, 130, and 140 may be together or separately implemented by some or all of the computer system illustrated in FIG. 7.

The entity datastore 101 may store data relating to known entities. For example, the entity datastore 101 may store an entity identifier, a location name, and/or other information known about the entity. The location name may include a string that describes the location of the entity, such as a city name, a locale name, and/or other name. The string may be unstructured, which may cause variability amongst locations names such as typographical or other errors, alternate location names, and/or other sources of variability.

Figure 6:
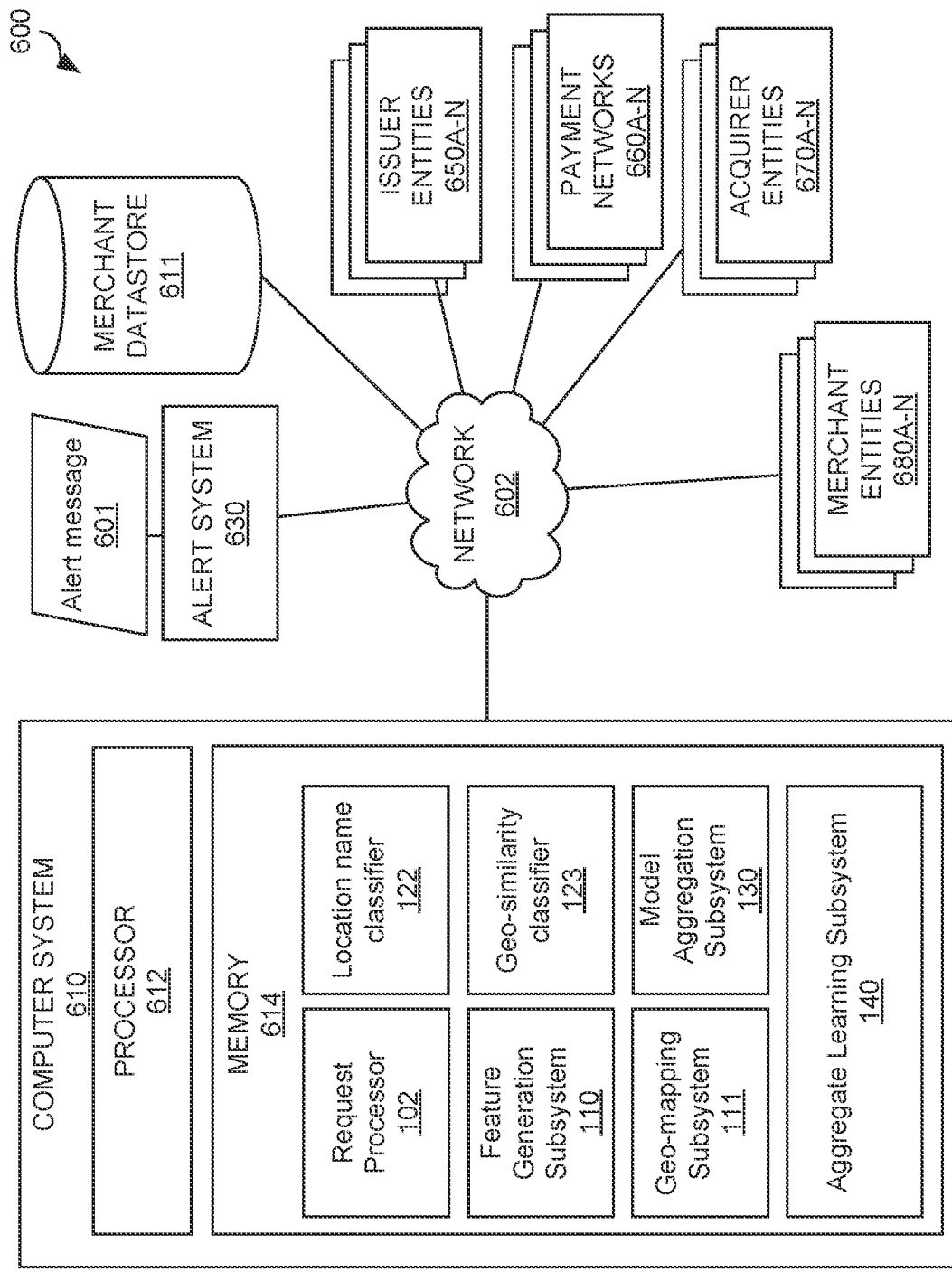
FIG. 6 illustrates an example of a computer environment implementing identification of mismatched geodata.

The request processor 102 may receive a request comprising an entity identifier, a location name 103A, and/or other information. The type of request will vary depending on the particular implementation of the system environment 100. One example of such implementation is illustrated in FIG. 6. The request processor 102 may access a known location of the entity identified by the entity identifier by retrieving a location name 103B from the entity datastore 101 based on the entity identifier. Because of the unstructured nature of the location name 103A and location name 103B, it may be difficult to computationally determine whether they match one another. The location names 103A and 103B match one another when they are determined to refer to the same geolocation. If the location names 103A and 103B do not refer to the same geolocation, a location name mismatch occurs, which may require further resolution.

To determine whether the location name 103A and location name 103B match, the system may generate at least two match classifications 124A and 124B based on ensemble modeling. Additional match classifications (not illustrated) may be ensembled together with 124A and 124B as well. The match classification 124A may be based on string similarity between the location names 103A and 103B. The match classification 124B may be based on geographic similarity using a proximity between geolocations defined by the location names 103A and 103B.

The feature generation subsystem 110 may generate one or more features 112 for training and executing one or more location name classifiers 122. For example, the feature generation subsystem 110 may generate features 112 by computing similarity metrics between the location names 103A and 103B. The feature generation subsystem 110 may generate a feature vector based on the similarity metrics. A feature vector is a numerical representation of the similarity metrics ordered in a way that the location name classifier 122 can apply consistently during training and execution. For example, the feature vector may be an N-dimensional vector (such as an N-dimensional array) of N-values in which N is the number of similarity metrics computed between the pair of input strings.

Table 1 illustrates an example of features 112 generated by the feature generation subsystem 110 for match classification. Although twelve features are listed, other numbers of features may be used.

| Feature Number | Feature Name | Feature Description |
| --- | --- | --- |
| 1. | Edit Distance such as Levenshtein distance | The number of characters that need to be substituted, inserted, or deleted, to transform s1 into s2 |
| 2. | Jaccard Distance | Distance metric comparing set-similarity. Lower score is better. |
| 3. | Jaro Similarity | The Jaro Similarity between is the min no. of single-character transpositions required to change one word into another. |
| 4. | Jaro Winkler Distance | The Jaro Winkler distance is an extension of the Jaro similarity |
| 5. | Cosine Distance | Compute the Cosine distance between 1-D arrays. |
| 6. | Direct Match | Check if all characters match and return 0 or 1(match). |
| 7. | Common Special Chars Count | Common special characters. |
| 8. | Longest Subsequence | Length of longest common substring. |
| 9. | Common Bigrams Count | Common substrings of length 2. |
| 10. | Common Trigrams Count | Common substrings of length 3. |
| 11. | Difference in Length | Difference between length of 2 strings |
| 12. | Acronym Match | Checking if first character from each word/string is a match. |
| . . . | . . . | . . . |

Figure 2:
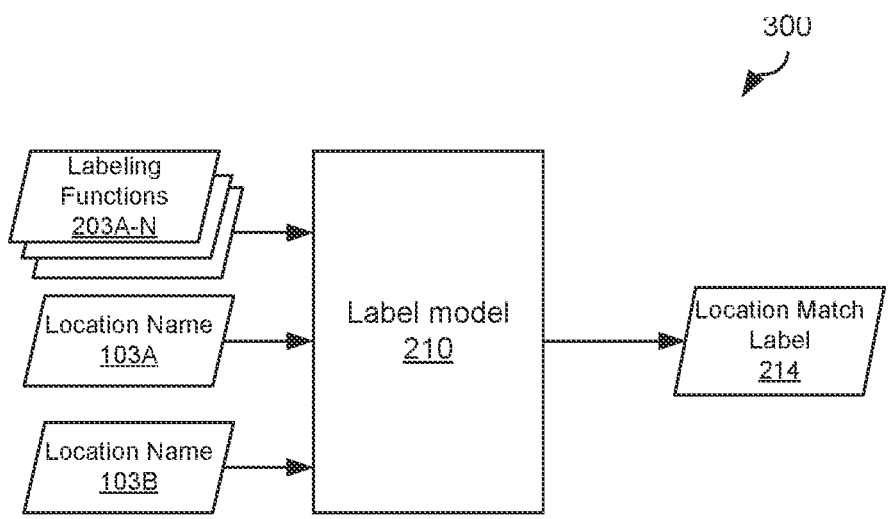
FIG. 2 illustrates a schematic example of generating location match labels for match classifications based on weak supervision-based labeling functions.

The location name classifier 122 may generate a match classification 124A that indicates a prediction that the location names 103A and 103B match. In some examples, the location name classifier 122 may use a match label that is automatically generated in association with weak supervision. An example of such weak supervision-based labeling is illustrated in FIG. 2.

The geo-mapping subsystem 111 may transform the location name 103A into a geocoordinate 113A and the location name 103B into a geocoordinate 113B for geo-similarity classification. A geocoordinate is positional data that indicates a location on Earth other than a location name. A geocoordinate may include a geocoordinate point such as a latitude and longitude point, geodetic coordinates that define a position on Earth, and/or other value that can be used to locate a point on Earth. Thus, geocoordinates 113A and 113B are each positional data that indicates a location on the planet.

A location name is transformable to a geocoordinate when the location name may be used to directly or indirectly obtain a corresponding geocoordinate. For example, a city name may be directly transformable to a geocoordinate if a latitude and longitude (lat/long) position of the city is known. Typically, though not necessarily, a reference point such as the center of the city will be used for the latitude and longitude coordinates. In another example, a city name may be indirectly transformable to a geocoordinate if the lat/long position for the city is unknown is known for an intervening location identifier. In this example, a city name may be directly transformable to a zip code, which is transformable to a lat/long position. To transform the location names 103A and 103B, the geo-mapping subsystem 111 may look up a location name in a mapping table that maps location names to geocoordinates, as city names directly or indirectly mapped to lat/long coordinates.

Figure 3:
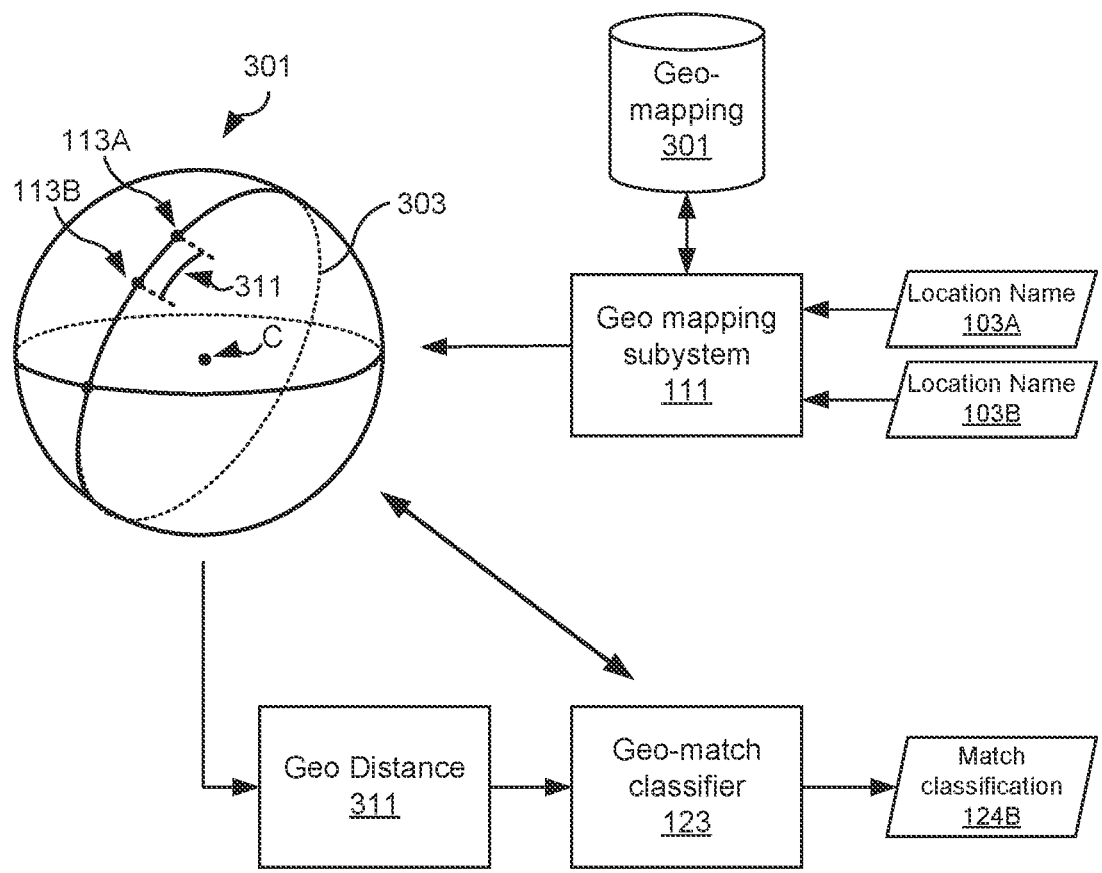
FIG. 3 illustrates a schematic example of determining a proximity-based match classification based on location names transformed into respective geocoordinates.

If available, the geocoordinates 113A and 113B may be provided to the geo-similarity classifier 123, which generates a match classification 124B. The match classification 124B is a prediction that the location names 103A and 103B match based on geo-similarity of their respectively transformed geocoordinates 113A and 113B. An example of geo-similarity classification is illustrated in FIG. 3.

The match classifications 124A and 124B (and/or other match classifications) may be aggregated by the model aggregation subsystem 130 to determine an aggregate match classification 134. The model aggregation subsystem 130 may aggregate the match classifications 124A-N based on various aggregation modes such as validation, aggregate metric, voting, and/or other aggregation techniques. In a validation mode of operation, the model aggregation subsystem 130 may aggregate the match classifications 124A and 124B based on a priority hierarchy. For example, the model aggregation subsystem 130 may rank the location name classifier 122 and the geo-similarity classifier 123 with respect to one another. The ranking may be configured by an operator of the system. In this example, the model aggregation subsystem 130 may validate the match classification 124 of a higher-ranked classifier with the match classification 124 of a lower-ranked classifier (or vice versa). In some of these examples, a match is determined only when a match classification 124A is validated by another match classification 124B. In the aggregate metric mode, the model aggregation subsystem 130 may aggregate the match classifications 124A and 124B based on an aggregate value such as a mean or median. In this mode, each of the match classifications 124 are output as a numeric probability of a match or mismatch and the model aggregation subsystem 130 may generate the aggregate match classification 134 by determining a mean or median of the output probabilities. In a voting mode of operation, the model aggregation subsystem 130 may determine the aggregate match classification 134 based on a majority rules vote of the match classifications 124. For match classifications 124 that are probabilistic outputs, the model aggregation subsystem 130 may convert the probability output to a binary class and count the binary classes. In this mode, the majority rules metric is a value defining a proportion of match classifications 124 that agree that a match between two or more match candidates is predicted. The proportion may be a simple majority (greater than 50%) or another value configured by the system operator.

In operation, each of the match classifications 124A and 124B may be monitored to determine whether the prediction was correct. For example, a subject matter expert may determine that a pair of location names 103A and 103B was correctly predicted as a match, which may be fed back to retrain one or more of the classifiers to improve their performance. For example, the data associated with the correct classification, such as the features 112, location names 103A and 103B, match classifications 124A and 124B, aggregate match classification 134, and/or other data may be fed back into the training dataset to retrain one or more of the classifiers. In this way, outputs of the execution and operation of the classifiers may be fed back to further improve modeling performance. In some examples, the feedback may be used to re-rank the location name classifier 122 and the geo-similarity classifier 123 based on their respective performances.

FIG. 2 illustrates a schematic example of generating location match labels 214 for match classifications based on weak supervision-based labeling functions 203. Weak supervision is an approach to machine learning in which labeled training sets are generated through one or more labeling functions 203 instead of manual annotation by subject matter experts. Weak supervision may yield more scalable, faster labeling and discovery of potentially important features that correlate with matches or mismatches. Labeling functions 203 may be provided to platforms that facilitate learning based on weak supervision, such as SNORKEL, UIPATH, and V7, among others.

A labeling function 203 is computational logic that evaluates input data and assigns a label to the input data based on the evaluation. The label may include a location match label 214 that indicates whether the location name 103A and location name 103B match. The computational logic may include executable instructions that specifically programs a computer to generate the location match label 214. The computational logic may be encoded in the form of computational rules, software instructions, hardware instructions, and/or other instructions that are executable by the computer.

Each labeling function 203 may specify criteria used to identify a label for that input data. For example, a labeling function 203 may include one or more conditional statements that specify the label classes. For binary (two-class) classification, the conditional statements may be an if-then logical construct. In this example, if a first condition is satisfied, then a first label (such as a match label) is assigned to the data. If the first condition is not satisfied, then a second label (such as a mismatch label) is assigned to the data. In some examples, multiple conditional statements may map to a particular class. For example, if the first condition is not satisfied, but a second condition different than the condition is satisfied, then the first label may still be assigned to the data. As an example, the foregoing multiple condition may be implemented via an if-elseif-then logical construct. A labeling function 203 may include such conditional logic for one or more of the features illustrated in Table 1. For example, a labeling function 203 may specify that if the edit distance between the location names 103A and 103B is >x, then assign a match label to the location names 103A and 103B, otherwise assign a mismatch label. In the foregoing, x is a predefined edit distance threshold value that may be configured by a subject matter expert. The labeling function 203 may include multiple conditions for multiple features. For example, a labeling function 203 may specify that if the edit distance is >x and the Jaccard distance is <y, then assign a match label to the location names 103A and 103B, otherwise assign a mismatch label. In the foregoing example, y is a predefined Jaccard distance threshold value that may be configured by a subject matter expert. Other numbers and combinations of features (such as from Table 1) may be used to configure a labeling function 203.

To leverage weak supervision, a plurality of labeling functions 203 may be used in combination with one another to label each data point (such as pair of match candidates) of the unlabeled training data 201. Each of the labeling functions 203 may use the same or different features and/or conditions as other combined labeling functions 203. When a plurality of labeling functions 203 are used, the output labels of some labeling functions 203 may agree while others may disagree. The variability of output labeling performance enables discovery of features that may be important for match classification, improving the performance of the match classifier 122A. For example, a first set of labeling functions 203 may result in a match label for typographical errors while a second set of labeling functions 203 may result in a mismatch label for the same typographical errors.

The label model 210 may itself be trained to identify sets of labeling functions 203 that provide accurate classes in the training dataset based on the variability of output labeling performance. For example, during training, if the first set of labeling functions 203 correctly labels the data (because the data is known to be matched), then the label model 210 may learn to trust that set of labeling functions 203 when they agree. In the foregoing example, the label model 210 may learn to trust the output of the first set of labeling functions 203 when they agree on a certain label, even if other labeling functions 203, such as the second set of labeling functions 203 disagree with that label. Other types of variations in the unstructured match candidates may be similarly detected and more accurately labeled. In this way, the label model 210 may be trained to learn which labeling functions 203 to trust and/or the situations in which to trust the labeling functions. Based on the foregoing, the label model 210 may output the location match label 214. In these examples, the label model 210 illustrates an example of the location name classifier 122 illustrated in FIG. 1.

FIG. 3 illustrates a schematic example 300 of determining a proximity-based match classification 124B based on location names 103A and 103B transformed into respective geocoordinates 113A and 113B. In this example, the match classification 124B may be based on the proximity between geocoordinates 113A and 113B. If the proximity is within a geo-similarity such as a threshold distance, then the match classification 124B will indicate a match between the location names 103A and 103B. Proximity-based match classifications may enable a computer to determine a match that would otherwise not be matched. For example, if a location name 103A is a city name and a location name 103B is a name of a specific neighborhood or borough within the city, then similarity-based match classifications may indicate a mismatch since the city name and borough name would be different. However, because the borough is within the city, a proximity-based match classification 124B would detect that location names 103A and 103B may refer to the same geolocation, such as the same city. In another example, if a location name 103A is a city name and a location name 103B is a name of a nearby suburb or other locale, then similarity-based match classifications may indicate a mismatch since the city name and locale name would be different. However, if the locale is sufficiently close to the city, a proximity-based match classification 124B would detect that location names 103A and 103B may refer to a similar geolocation.

To determine the proximity of location names 103A and 103B, the geo-mapping subsystem 111 may transform the names into respective geocoordinates 113A and 113B. For example, the geo-mapping subsystem 111 may consult a geo-mapping 301, which may store a direct or indirect mapping of location names to geocoordinates. In direct mappings, the geo-mapping 301 may store a location name directly with a corresponding geocoordinate. In indirect mappings, the geo-mapping 301 may store location name directly with a corresponding intervening location value such as a zip code, which may itself be directly or indirectly mapped to a corresponding geocoordinate. Thus, the geo-mapping subsystem 111 may use the geo-mapping 301 to transform the location names 103A and 103B into respective geocoordinates 113A and 113B.

The geocoordinates 113A and 113B may each be a value that indicates a point on the globe. The globe may be modeled as a spherical object in model 301. In model 301, the surface of the globe may be represented by geodesics 303, which are conceptual circles on the globe whose centers coincide with the center (C) of the globe. Only one geodesic 303 along with an unlabeled equatorial geodesic is shown for clarity. A distance between the geocoordinates 113A and 113B may be determined as a geo-distance 311 based on an arc between geocoordinates 113A and 113B along the surface of the model 301. The geo-distance 311 may be based on a Haversine distance, Vincenty distance, and/or other metric for measuring the surface distance between two points on a sphere or ellipsoid.

In some examples, the geo-distance 311 is the shortest distance between the geocoordinates 113A and 113B along the surface and is not the Euclidean distance between those two points because of the spherical nature of the Earth. The two points defined by geocoordinates 113A and 113B separate the geodesic 303 into two arcs: one that represents the geo-distance 311 and the remaining portion of the geodesic 303. The geo-distance 311 may be determined based on a spherical law of cosines, which uses an estimated radius of the Earth. For example, the equatorial radius is approximately 6378 km while the radius from the center to each pole is approximately 6356 km.

Because the Earth is not perfectly spherical due to rotation, and the geo-distance 311 is based on an estimated radius (such as one or average of the radii) rather than an absolute radius of a perfect sphere, the distances between two points will have a certain error. On computer systems with low floating point precision, the spherical law of cosines formula can have large rounding errors if the distance is small. This is the oftentimes a problem when performing geo-similarity classification because distances to be determined will be small (such as when determining the distance between the center of a city and the center of a borough within the city). For example, if geocoordinates 113A and 113B are a kilometer apart on the surface of the Earth, the cosine of the central angle for the spherical law of cosines is near 0.99999999. The Haversine distance is numerically well-suited for these small distances. In simplified form, the Haversine distance (geo-distance 311) may be given by Equation 1:

$$hav(\theta)=\sin^2(\theta/2) \quad (1).$$

In equation (1), θ is the central angle between two points on a sphere, such as geocoordinates 113A and 113B. The central angle (θ) may be given by Equation 2:

$$\theta = \frac{d}{r}, \quad (2)$$

in which:
d=the spherical distance between the two points along a great circle of the sphere (see spherical distance), and
r=the radius of the sphere (in this case, mean radius of the Earth).

In some examples, instead of or in addition to the Haversine distance, a Vincenty distance may be used. The Vincenty distance assumes that the Earth has an ellipsoidal rather than spherical shape. More particularly, the Vincenty distance assumes the Earth has a rotational ellipsoid shape.

The geo-match classifier 123 may generate the match classification 124B based on the geo-distance 311. For example, the geo-match classifier 123 may include rules-based logic that evaluates the geo-distance 311 to determine whether the geo-distance 311 is small enough to be considered a match. The rules-based logic may include, for example, a threshold geo-similarity that defines a distance threshold. The distance threshold may be initially configured by an operator of the system. In some examples, the distance threshold may vary depending on the location. For example, some parts of the world may have sprawling cities or locations for which the distance threshold may be higher than for cities that are smaller or more dense geographically. In some examples, the distance threshold may be updated iteratively based on automated learning. For example, by making match classifications 124B and then obtaining feedback indicating the accuracy of the match classifications 124B, the geo-match classifier 123 may be trained (or re-trained) to determine or update the distance threshold.

Referring back to FIG. 1, in some examples, the aggregate learning subsystem 140 may take as input aggregate match classification 134 and train a model to predict whether or not a pair of location names match. For example, the features 112, geocoordinates 113A and 113B, match classifications 124A and 124B, aggregate match classification 134, and/or other data relating to the aggregate match classification 134 may be stored in ML storage 141 for training by the aggregate learning subsystem 140. In some examples, the classifier rankings, distance threshold for geo-similarity classification, and/or other data used for generating match classifications may be updated based on the retraining.

In some examples, the aggregate learning subsystem 140 may train or retrain various models using modeling techniques such as gradient boosting (in particular examples, Gradient Boosting Machines (GBM), XGBoost, LightGBM, or CatBoost). Gradient boosting is a machine learning ("ML") technique for regression and classification problems, which produces a prediction model in the form of an ensemble of weak prediction models, typically decision trees. GBM may build a model in a stage-wise fashion and generalizes the model by allowing optimization of an arbitrary differentiable loss function. GBM may operate on categories/sub-categories of features, making it suited for the features 112 described herein. However, other ML techniques may be used as well, such as neural networks. A neural network, such as a recursive neural network, may refer to a computational learning system that uses a network of neurons to translate a data input of one form into a desired output. A neuron may refer to an electronic processing node implemented as a computer function, such as one or more computations. The neurons of the neural network may be arranged into layers. Each neuron of a layer may receive as input a raw value, apply a classifier weight to the raw value, and generate an output via an activation function. The activation function may include a log-sigmoid function, hyperbolic tangent, Heaviside, Gaussian, SoftMax function and/or other types of activation functions.

Figure 4:
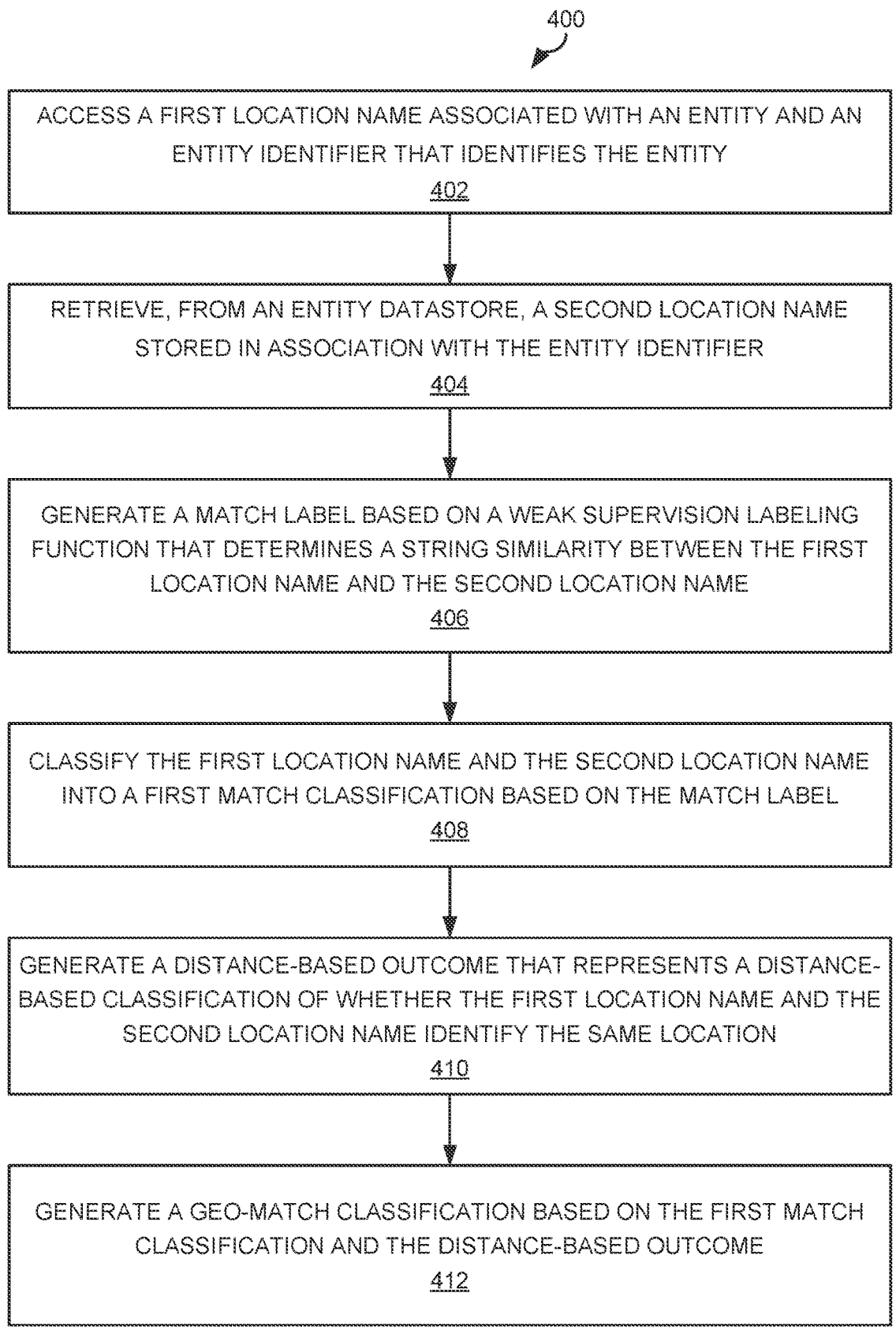
FIG. 4 illustrates an example of a method for generating match classifications for location data based on an ensemble of weak supervision-based match labels and geo similarity models.

FIG. 4 illustrates an example of a method 400 for generating match classifications for location data based on an ensemble of weak supervision-based match labels and geo similarity models. At 402, the method 400 may include accessing a first location name (such as location name 103A) associated with an entity and an entity identifier that identifies the entity. At 404, the method 400 may include retrieving, from an entity datastore 101, a second location name (such as location name 103B) stored in association with the entity identifier. At 406, the method 400 may include generating a match label based on a weak supervision labeling function that determines a string similarity between the first location name and the second location name. At 408, the method 400 may include classifying the first location name and the second location name into a first match classification based on the match label.

At 410, the method 400 may include generating a distance-based outcome that represents a distance-based classification of whether the first location name and the second location name identify the same location. The distance-based outcome may include a non-classification in which, for example, the first location name and the second location name are both not transformable to respective geocoordinates. Non-classification may therefore be the distance-based outcome because the geo-similarity classifier 123 may be unable to determine geo-similarity without both geocoordinates. On the other hand, when the first location name and the second location name are both transformable to respective geocoordinates, the distance-based outcome may include a match classification 124B.

At 412, the method 400 may include generating a geo-match classification based on the first match classification and the distance-based outcome.

Figure 5:
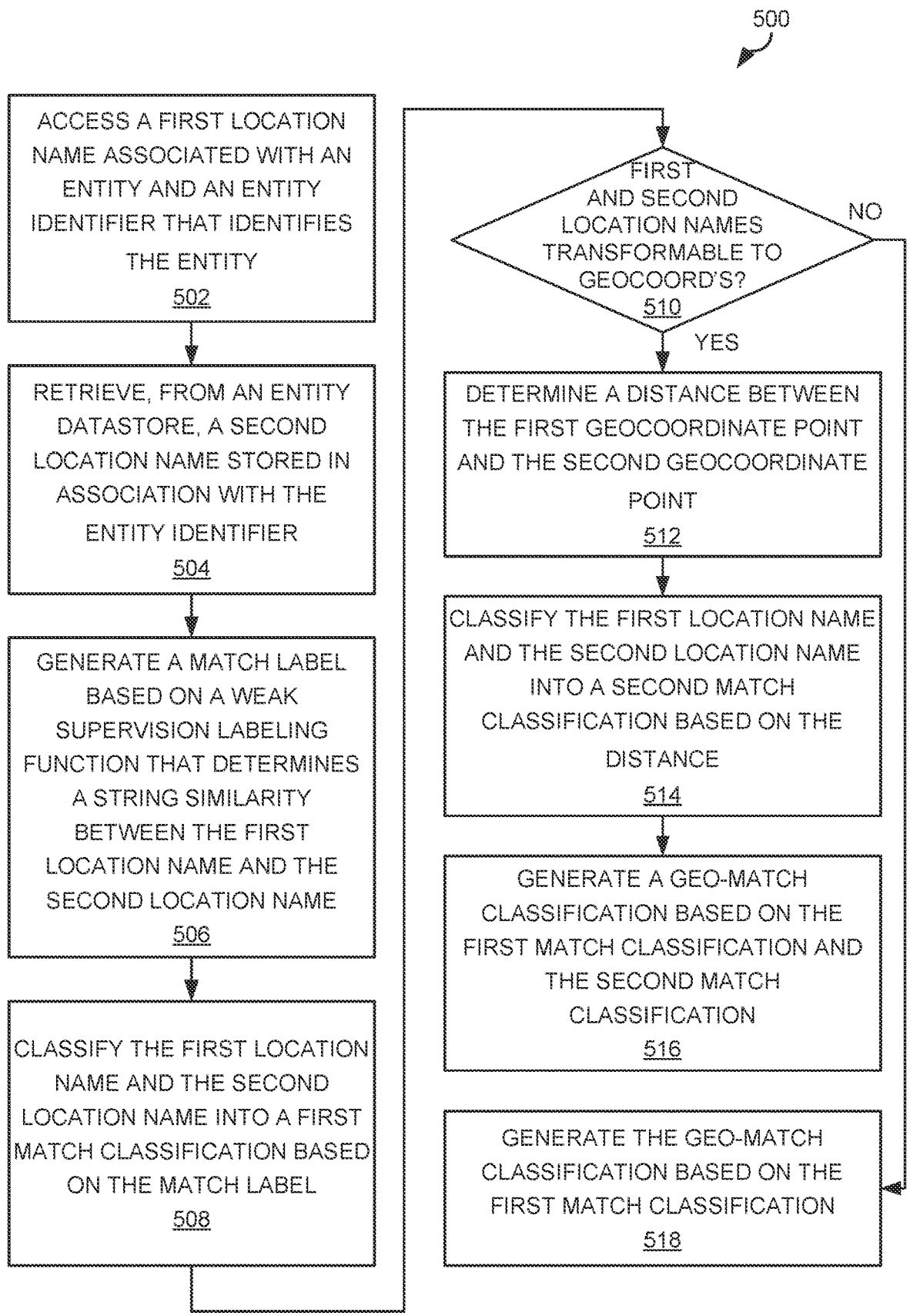
FIG. 5 illustrates another example of a method for generating match classifications for location data based on an ensemble of weak supervision-based match labels and geo similarity models.

FIG. 5 illustrates another example of a method 500 for generating match classifications for location data based on an ensemble of weak supervision-based match labels and geo similarity models.

At 502, the method 500 may include accessing a first location name 103A associated with an entity and an entity identifier that identifies the entity. At 504, the method 500 may include retrieving, from an entity datastore 101, a second location name 103B stored in association with the entity identifier. At 506, the method 500 may include generating a match label (such as location match label 214 illustrated in FIG. 2) based on a weak supervision labeling function 203 that determines a string similarity between the first location name and the second location name.

At 508, the method 500 may include classifying the first location name and the second location name into a first match classification 124A based on the match label. At 510, the method 500 may include determining whether the first location name is transformable to a first geocoordinate 113A and the second location name is transformable to a second geocoordinate 113B. If the first location name is transformable to a first geocoordinate and the second location name is transformable to a second geocoordinate, the method 500 may proceed to 512-516. At 512, the method 500 may include determining a distance between the first geocoordinate point and the second geocoordinate point. At 514, the method 500 may include classifying the first location name and the second location name into a second match classification 124B based on the distance. At 516, the method 500 may include generating a geo-match classification (such as the aggregate match classification 134) based on the first match classification and the second match classification.

Returning to 510, if both the first and second location names are not transformable to respective first and second geocoordinates, the method 500 may proceed to 518.

FIG. 6 illustrates an example of a system environment 600 implementing identification of mismatched geodata. The system environment 600 may implement an electronic payment system that facilitates payment transactions across various entities. For example, the system environment 600 may include a computer system 610, an alert system 630, issuer entities 650 (illustrated as issuer entities 650A-N), payment networks 660 (illustrated as payment networks 660A-N), acquirer entities 670 (illustrated as acquirer entities 670A-N), merchant entities 680 (illustrated as merchant entities 680A-N), and/or other features. At least some of the components of the system environment 600 may be connected to one another via a network 602, which may include the Internet, an intranet, a Personal Area Network, a LAN (Local Area Network), a WAN (Wide Area Network), a SAN (Storage Area Network), a MAN (Metropolitan Area Network), a wireless network, a cellular communications network, a Public Switched Telephone Network, and/or other network through which system environment 600 components may communicate.

A merchant entity 680 may receive a payment network-based payment to be settled against a payment account such as a credit card account issued by an issuer entity 650. When a terminal device reads a payment device such as a credit card or digital wallet, the terminal device may transmit a message, via the merchant's acquirer entity 670, to a payment network 660. The message may include, among other data, details of the payment transaction such as an amount, a payment account identifier, and information about the requesting terminal such as a card acceptor name and a card acceptor location (which is an example of a location name 103A). In this example, the message is an example of a request illustrated in FIG. 1 and the message recipient is an example of a request processor. The card acceptor name may be the name of the merchant entity 680 and the card acceptor location may include a string that identifies the location of the terminal or the merchant entity 680. The message may be formatted according to industry standard message protocols, such as the International Organization for Standardization standard for systems that exchange electronic transactions initiated by cardholders using payment cards, also referred to as the ISO 8583 standard, although other message encodings may be used.

The payment network may maintain a merchant datastore 611, which stores a merchant identifier such as a merchant name, a city or other location name of the merchant (which is an example of a location name 103B), and/or other information about the merchant entity 680 involved in the payment transaction. The payment network 660 may transmit the message to the issuer 650 for authorization of the transaction amount. The issuer entity 650 may extract relevant details from the message such as the transaction amount, the payment account identifier, the card acceptor name and the card acceptor location. The issuer entity 650 may transmit back to the payment network 660 a message with additional data such as an authorization response, which the payment network 660 relays to the merchant's acquirer entity 670, and ultimately the merchant entity 680. If authorized, the merchant entity 680 may consummate the transaction, which will be settled for payment through a settlement process. Later, the issuer entity 650 may prepare an account statement for the payment account, listing authorized transactions including details of each transaction such as the transaction amount, the card acceptor name, and the card acceptor location, among other data. This is so that the accountholder is able to ensure that charges were recognized.

In some instances, the card acceptor location from a given transaction may be unrecognized by the accountholder, leading to mistaken claims of fraud or mistake. For example, the card acceptor location may include a city name that the accountholder has not visited and may therefore suspect the transaction was fraudulent or was a mistake. This may occur when the card acceptor location names a city or other location that is different than what the cardholder expects should be listed. For example, the cardholder may have made a purchase in Queens NY without realizing that the merchant is associated or is within Queens. If the card acceptor location indicates "Queens NY" rather than "New York City" then this may lead to cardholder confusion. In this case, the account holder may dispute the charge, and request a chargeback. Chargebacks may result in extensive investigation by various entities such as the issuer entity 650. Thus, chargeback processing may result in inefficiencies that are particularly wasteful when the chargeback request is made in error, such as when the card acceptor name is not what is expected.

To mitigate against these and other issues, the alert system 630 may receive and share alert messages 601 among a network of entities. An alert message 601 is electronic data that indicates an anomalous state that should be investigated, mitigated, or otherwise resolved by an entity in the network of entities. To share an alert message 601, the alert system 630 may identify the relevant entity that should act on the anomalous state and transmit an alert message 601 to the identified entity.

In one example, a type of alert message 601 may include an alert that the card acceptor location (such as a location name 103A) from a transaction message is not the same as a merchant location name (such as a location name 103B) stored in the merchant datastore 611. This alert may proactively alert entities such as merchant entities 680, issuer entities 650, and payment networks 660 to the possibility of an error that results in a chargeback or other inefficiencies.

For example, the card acceptor name for a merchant entity 680 involved in a transaction may be "Livingston" but the merchant location name stored in the merchant datastore 611 may be "London" even though both location names are associated with the same merchant identifier. The various computer systems involved in payment transactions compute a scale of transactions that require computers to detect these anomalies. However, a computer may be unable to determine whether or not "Livingston" and "London" should be matched or mismatched for purposes of detecting an anomaly with the location names. The alert system 630 may transmit an alert message 601 indicating this anomaly for resolution or mitigation. For example, to mitigate against chargebacks or other inefficiencies, the merchant entity 680 involved in the transaction may have one or more both of the location names revised and/or may inform the customer of the discrepancy. Alternatively, or additionally, the issuer entity 650 may be made aware of the discrepancy and may inform the accountholder to facilitate efficient resolution.

To detect potentially anomalous location names, a computer system 610 may include one or more computing device that are specifically programmed and improved to implement one or more of the features illustrated in FIG. 1. For example, the one or more computing devices of the computer system 610 may each include a processor 612, a memory 614, and/or other components. The processor 612 may be a semiconductor-based microprocessor, a central processing unit (CPU), an application specific integrated circuit (ASIC), a field-programmable gate array (FPGA), and/or other suitable hardware device. Although the computer system 610 has been depicted as including a single processor 612, it should be understood that the computer system 610 may include multiple processors, multiple cores, or the like. The memory 614 may be an electronic, magnetic, optical, or other physical storage device that includes or stores executable instructions. The memory 614 may be, for example, Random Access memory (RAM), an Electrically Erasable Programmable Read-Only Memory (EEPROM), a storage device, an optical disc, and the like. The memory 614 may be a non-transitory machine-readable storage medium, where the term "non-transitory" does not encompass transitory propagating signals. The memory 614 may store a feature generation subsystem 110, a geo-mapping subsystem 111, a location name classifier 122, a geo-similarity classifier 123, a model aggregation subsystem 130, and an aggregate learning subsystem 140 that may each be executed by the processor 612. It should be noted that the computer system 610 may itself be implemented by one or more of the entities illustrated in FIG. 6, such as the alert system 630, an issuer entity 650, a payment network 660, an acquirer entity 670 and/or a merchant entity 680.

Table 1. Table 1 illustrates an example of aggregate match classifications 134 based on match classifications 124 of location names 103A and 103B. In this example, the location name 103 "Luton,beds" and "Luton" are matched by the location name classifier 122 but the geo-similarity classifier 123 does not generate a match classification because "Luton, beds" is not transformable to a geocoordinate. Thus, the aggregate match classification 134 is a match based on the match classification from the location name classifier 122. In this example, the system is able to detect similarity of location names even though they appear to be different strings from a computational perspective.

Table 2. Table 2 illustrates an example of aggregate match classifications 134 based on match classifications 124 of location names 103A and 103B. In this example, the location name 103 "Livingston" and "London" are matched by the location name classifier 122 (even though the strings are different they may be sufficiently similar from a string match perspective). The geo-similarity classifier 123 generates a match classification indicating a mismatch because "Livingston" and "London" have a geo-distance between respective geocoordinates that is not within a threshold value for similarity. In this instance, the aggregate match classification 134 is a mismatch because the geo-similarity classifier 123 is ranked higher than the location name classifier 122 for purposes of disagreement between the two models. Thus, in this example, the system may mitigate against errors in string similarity modelling resulting in false positives based on geo-similarity modelling.

| | Acceptor | | |
| --- | --- | --- | --- |
| Model | Card Acceptor Location (location name 103A) | Merchant Location from Merchant Datastore (location name 103B) | Match Classification |
| Location Name Classifier 122 (String Similarity) | Livingston | London | Match |
| Geo-similarity classifier 123 (proximity-based) | Livingston | London | Mismatch |
| Aggregate match classification 134 (Overall Result) | | | Mismatch |

Table 3. Table 3 illustrates an example of aggregate match classifications 134 based on match classifications 124 of location names 103A and 103B. In this example, the location name 103 "Livingston" and "London" are matched by the location name classifier 122 (even though the strings are different they may be sufficiently similar from a string match perspective). The geo-similarity classifier 123 generates a match classification indicating a mismatch because "Queens" and "New York City" are mismatched from a string similarity perspective but have a geo-distance between respective geocoordinates that is within a threshold value for similarity. In this instance, the aggregate match classification 134 is a match because the geo-similarity classifier 123 is ranked higher than the location name classifier 122 for purposes of disagreement between the two models. Thus, in this example, the system may mitigate against errors in string similarity modelling resulting in false negatives based on geo-similarity modelling.

| | Acceptor | | |
| --- | --- | --- | --- |
| Model | Card Acceptor Location (location name 103A) | Merchant Location from Merchant Datastore (location name 103B) | Match Classification 124 |
| Location Name Classifier 122 (String Similarity) | Luton, beds | Luton | Match |
| Geo-similarity classifier 123 (proximity-based) | Luton, beds | Luton | N/A |
| Aggregate match classification 134 (Overall Result) | | | Match |

| | Acceptor | | |
| --- | --- | --- | --- |
| Model | Card Acceptor Location (location name 103A) | Merchant Location from Merchant Datastore (location name 103B) | Match Classification |
| Location Name Classifier 122 (String Similarity) | Queens | New York City | Mismatch |
| Geo-similarity classifier 123 (proximity-based) | Queens | New York City | Match |
| Aggregate match classification 134 (Overall Result) | | | Match |

Figure 7:
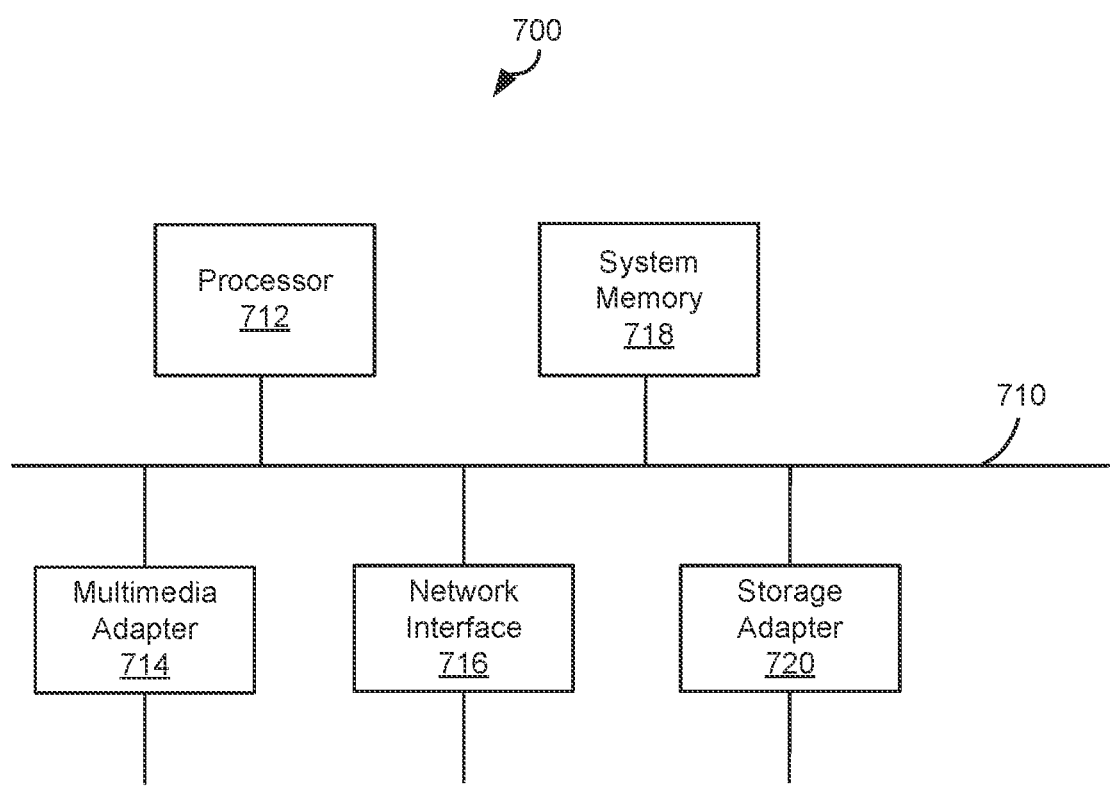
FIG. 7 illustrates an example of a computer system that may be implemented by components illustrated in FIGS. 1-3 and 6.

FIG. 7 illustrates an example of a computer system 700 that may be implemented by any of the components described in FIGS. 1-3 and 5. The computer system 700 may include, among other things, an interconnect 710, a processor 712, a multimedia adapter 714, a network interface 716, a system memory 718, and a storage adapter 720.

The interconnect 710 may interconnect various subsystems, elements, and/or components of the computer system 700. As shown, the interconnect 710 may be an abstraction that may represent any one or more separate physical buses, point-to-point connections, or both, connected by appropriate bridges, adapters, or controllers. In some examples, the interconnect 710 may include a system bus, a peripheral component interconnect (PCI) bus or PCI-Express bus, a HyperTransport or industry standard architecture (ISA)) bus, a small computer system interface (SCPI) bus, a universal serial bus (USB), IIC (I2C) bus, or an Institute of Electrical and Electronics Engineers (IEEE) standard 1384 bus, or "firewire," or other similar interconnection element.

In some examples, the interconnect 710 may allow data communication between the processor 712 and system memory 718, which may include read-only memory (ROM) or flash memory (neither shown), and random-access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 712 may control operations of the computer system 700. In some examples, the processor 712 may do so by executing instructions such as software or firmware stored in system memory 718 or other data via the storage adapter 720. In some examples, the processor 712 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 714 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 716 may provide the computer system 700 with an ability to communicate with a variety of remote devices over a network. The network interface 716 may include, for example, an Ethernet adapter, a Fibre Channel adapter, and/or other wired- or wireless-enabled adapter. The network interface 716 may provide a direct or indirect connection from one network element to another and facilitate communication and between various network elements. The storage adapter 720 may connect to a standard computer readable medium for storage and/or retrieval of information, such as a fixed disk drive (internal or external).

In some examples, a computer system may perform match classification based on output of the matching subsystem 120 alone, output of the location name classifier 122 alone, or both outputs. When both outputs are used, a match classification outputted by the matching subsystem 120 may be validated by the output of the location name classifier 122.

Other devices, components, elements, or subsystems (not illustrated) may be connected in a similar manner to the interconnect 710 or via a network. The devices and subsystems can be interconnected in different ways from that shown in FIG. 6. Instructions to implement various examples and implementations described herein may be stored in computer-readable storage media such as one or more of system memory 718 or other storage. Instructions to implement the present disclosure may also be received via one or more interfaces and stored in memory. The operating system provided on computer system 700 may be MS-DOS®, MS-WINDOWS®, OS/2®, OS X®, IOS®, ANDROID®, UNIX®, Linux®, or another operating system.

Although illustrated as using ensembled approaches, in some implementations, each classifier 122, 123 may be executed individually to make a match classification. For example, the location name classifier 122 illustrated in FIGS. 1 and 2 may generate a match classification that is used alone to determine whether location names 103A and 103B are matched. Likewise, the geo-similarity classifier 123 illustrated in FIGS. 1 and 3 may generate a match classification that is used alone to determine whether location names 103A and 103B are matched.

The term "model" may refer to computer functions that provide functionality described with respect to that model. Such functionality may be "automatic" in that the model may provide such functionality without human intervention. Throughout the disclosure, the terms "a" and "an" may be intended to denote at least one of a particular element. As used herein, the term "includes" means includes but not limited to, the term "including" means including but not limited to. The term "based on" means based at least in part on. In the Figures, the use of the letter "N" to denote plurality in reference symbols is not intended to refer to a particular number. For example, "120A-N" does not refer to a particular number of instances of 120A-N, but rather "two or more."

The databases (such as the data structures 101, 141, 301, 611) may be, include, or interface to, for example, an Oracle™ relational database sold commercially by Oracle Corporation. Other databases, such as Informix™, DB2 or other data storage, including file-based (such as spreadsheet or extensible markup language documents), or query formats, platforms, or resources such as OLAP (On Line Analytical Processing), SQL (Structured Query Language), a SAN (storage area network), cloud-based storage, Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein.

The systems and processes are not limited to the specific embodiments described herein. In addition, components of each system and each process can be practiced independent and separate from other components and processes described herein. Each component and process also can be used in combination with other assembly packages and processes. The flow charts and descriptions thereof herein should not be understood to prescribe a fixed order of performing the method blocks described therein. Rather the method blocks may be performed in any order that is practicable including simultaneous performance of at least some method blocks. Furthermore, each of the methods may be performed by one or more of the system components illustrated in FIG. 1.

This written description uses examples to disclose the embodiments, including the best mode, and to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system of geo-match classification based on automatically generated geo-labels using weak supervision and distance-based validation, the system comprising:
   a processor programmed to:
   access a first location name associated with an entity and an entity identifier that identifies the entity;
   retrieve, from an entity datastore, a second location name stored in association with the entity identifier;
   generate a match label based on a weak supervision labeling function that determines a string similarity between the first location name and the second location name;
   classify the first location name and the second location name into a first match classification based on the match label;
   generate a distance-based outcome based on a distance between a first geolocation associated with the first location name and a second geolocation associated with the second location name; and
   generate a geo-match classification based on the first match classification and the distance-based outcome.

2. A system, comprising:
   a processor programmed to:
   access a first location name associated with an entity and an entity identifier that identifies the entity;
   retrieve, from an entity datastore, a second location name stored in association with the entity identifier;
   generate a match label based on a weak supervision labeling function that determines a string similarity between the first location name and the second location name;
   classify the first location name and the second location name into a first match classification based on the match label;
   generate a distance-based outcome that represents a distance-based classification of whether the first location name and the second location name identify the same location; and
   generate a geo-match classification based on the first match classification and the distance-based outcome,
   wherein to generate the distance-based outcome, the processor is further programmed to:
   determine that a first geocoordinate point is available for the first location name and a second geocoordinate point is available for the second location name;
   determine a distance between the first geocoordinate point and the second geocoordinate point; and
   classify the first location name and the second location name into a second match classification based on the distance,
   wherein the distance-based outcome comprises the second match classification and the geo-match classification based on the first match classification and the second match classification.

3. The system of claim 2, wherein the first match classification and the second match classification agree with one another, and wherein the processor is further programmed to:
   determine whether the first match classification and the second match classification agree with one another; and
   determine a level of confidence in the geo-match classification based on whether the first match classification and the second match classification agree with one another.

4. The system of claim 2, wherein to determine the distance, the processor is further programmed to:
   determine a Haversine distance between the first geocoordinate point and the second geocoordinate point based on an assumption of a spherical global shape.

5. The system of claim 2, wherein to determine the distance, the processor is further programmed to:
   determine a Vincenty distance between the first geocoordinate point and the second geocoordinate point based on an assumption of an ellipsoid global shape.

6. The system of claim 1, wherein to generate the distance-based outcome, the processor is further programmed to:
   determine that a first geocoordinate point is not available for the first location name and/or a second geocoordinate point is not available for the second location name;
   determine that the first location name and the second location name cannot be classified into a second match classification based on unavailability of the first geocoordinate point and/or the second geocoordinate point; and
   generate the geo-match classification based on the first match classification without the second match classification.

7. The system of claim 6, wherein the processor is further programmed to:
   determine a level of confidence in the geo-match classification based on the determination that the first location name and the second location name cannot be classified into a second match classification based on a distance between the first geocoordinate point and the second geocoordinate point.

8. The system of claim 1, wherein to classify the first location name and the second location name into a first match classification, the processor is further programmed to:
   determine a string similarity metric between the first location name and the second location name.

9. The system of claim 1, wherein to access the first location name and the entity identifier, the processor is further programmed to:
   receive, from a remote device, a request comprising the first location name and the entity identifier; and
   wherein to generate the geo-match classification, the processor is further programmed to:
   determine a mismatch between the first location name and the second location name;
   transmit an alert indicating the mismatch responsive to the request.

10. A method of geo-match classification based on automatically generated geo-labels using weak supervision and distance-based validation, the method comprising:

accessing, by a processor, a first location name associated with an entity and an entity identifier that identifies the entity;

retrieving, by the processor, from an entity datastore, a second location name stored in association with the entity identifier;

generating, by the processor, a match label based on a weak supervision labeling function that determines a string similarity between the first location name and the second location name;

classifying, by the processor, the first location name and the second location name into a first match classification based on the match label;

generating, by the processor, a distance-based outcome based on a distance between a first geolocation associated with the first location name and a second geolocation associated with the second location name; and generating, by the processor, a geo-match classification based on the first match classification and the distance-based outcome.

11. A method, comprising:

accessing a first location name associated with an entity and an entity identifier that identifies the entity;

retrieving from an entity datastore, a second location name stored in association with the entity identifier;

generating a match label based on a weak supervision labeling function that determines a string similarity between the first location name and the second location name;

classifying the first location name and the second location name into a first match classification based on the match label;

generating a distance-based outcome that represents a distance-based classification of whether the first location name and the second location name identify the same location; and generating a geo-match classification based on the first match classification and the distance-based outcome, wherein generating the distance-based outcome comprises:

determining that a first geocoordinate point is available for the first location name and a second geocoordinate point is available for the second location name;

determining a distance between the first geocoordinate point and the second geocoordinate point; and classifying the first location name and the second location name into a second match classification based on the distance, wherein the distance-based outcome comprises the second match classification and the geo-match classification based on the first match classification and the second match classification.

12. The method of claim 11, wherein the first match classification and the second match classification agree with one another, and wherein the method further comprising:

determining whether the first match classification and the second match classification agree with one another; and determining a level of confidence in the geo-match classification based on whether the first match classification and the second match classification agree with one another.

13. The method of claim 11, determining the distance comprises:

determining a Haversine distance between the first geocoordinate point and the second geocoordinate point based on an assumption of a spherical shape.

14. The method of claim 11, wherein determining the distance comprises:

determining a Vincenty distance between the first geocoordinate point and the second geocoordinate point based on an assumption of an ellipsoid global shape.

15. The method of claim 10, wherein to generate the distance-based outcome, the processor is further programmed to:

determining that a first geocoordinate point is not available for the first location name and/or a second geocoordinate point is not available for the second location name;

determining that the first location name and the second location name cannot be classified into a second match classification based on unavailability of the first geocoordinate point and/or the second geocoordinate point; and generating the geo-match classification based on the first match classification without the second match classification.

16. The method of claim 15, further comprising:

determining a level of confidence in the geo-match classification based on the determination that the first location name and the second location name cannot be classified into a second match classification.

17. The method of claim 10, wherein classifying the first location name and the second location name into a first match classification comprises:

determining a string similarity metric between the first location name and the second location name.

18. The method of claim 10, wherein accessing the first location name and the entity identifier comprises:

receiving, from a remote device, a request comprising the first location name and the entity identifier; and wherein generating the geo-match classification comprises:

determining a mismatch between the first location name and the second location name;

transmitting an alert indicating the mismatch responsive to the request.

19. A non-transitory computer readable medium configured to store instructions that, when executed by a processor, programs the processor to:

access a first location name associated with an entity and an entity identifier that identifies the entity;

retrieve, from an entity datastore, a second location name stored in association with the entity identifier;

generate a match label based on a weak supervision labeling function that determines a string similarity between the first location name and the second location name;

classify the first location name and the second location name into a first match classification based on the match label;

determine whether the first location name is transformable to a first geocoordinate point and a second location name is transformable to a second geocoordinate point;

when the first geocoordinate point and the second geocoordinate point are available:

determine a distance between the first geocoordinate point and the second geocoordinate point;

classify the first location name and the second location name into a second match classification based on the distance;

generate a geo-match classification based on the first match classification and the second match classification; and when the first geocoordinate point and the second geocoordinate point are not available:
  generate the geo-match classification based on the first match classification.

20. The system of claim 1, wherein to determine the distance, the processor is further programmed to:
  select the second match classification if the first match classification and the second match classification disagree with one another.

* * * * *